United States Patent [19]

Thomas et al.

[11] 4,433,543
[45] Feb. 28, 1984

[54] POWER-OPERATED BOOSTERS

[75] Inventors: Alfred W. Thomas, Koblenz; Helmut Heibel, Moschheim, both of Fed. Rep. of Germany

[73] Assignee: Lucas Industries Limited, Birmingham, England

[21] Appl. No.: 256,778

[22] Filed: Apr. 23, 1981

[30] Foreign Application Priority Data

Apr. 23, 1980 [GB] United Kingdom ............... 8013427
Jan. 21, 1981 [GB] United Kingdom ............... 8101762

[51] Int. Cl.³ .............................................. B60T 13/00
[52] U.S. Cl. ................................... 60/547.1; 60/581; 91/378
[58] Field of Search ............... 91/517, 518, 378, 460; 60/581, 547 R, 547 B

[56] References Cited

U.S. PATENT DOCUMENTS

| 3,817,152 | 6/1974 | Viron | 91/517 |
| 3,819,021 | 6/1974 | Schacher et al. | 91/517 |
| 3,988,967 | 11/1976 | Przel | 91/460 |
| 4,024,713 | 5/1977 | Ueda | 60/547 B |
| 4,225,022 | 9/1980 | Belart | 60/549 |
| 4,341,076 | 7/1982 | Steffes | 60/547 R |

Primary Examiner—Paul E. Maslousky
Attorney, Agent, or Firm—Scrivener, Clarke, Scrivener and Johnson

[57] ABSTRACT

A booster for a vehicle braking system has an input piston, a boost piston and an output piston working a bore, the boost piston being advanced in the bore in response to pressure fluid from a source pressurizing a boost chamber under control of a valve.

The operation of the valve is dependent on the pressure in the system, and the valve has a valve mechanism working in a bore in the boost piston of which one part has a pressure-responsive face, the valve being operative, on initial movement of the input piston to cause pressurization of the braking system to the threshold level, and application of pressure fluid to the pressure-responsive face to move the part relative to the input piston to place the boost chamber in communication with the pressure source. Threshold pressurization of the braking system may be achieved by pressurization of the boost chamber, or an auxiliary chamber forward of the boost piston to a predetermined level.

19 Claims, 11 Drawing Figures

POWER-OPERATED BOOSTERS

SPECIFIC DESCRIPTION

This invention relates to pedal-operated boosters for vehicle braking systems of the kind comprising a housing provided with a bore, an inlet port for connection to a fluid pressure source, an exhaust port for connection to a reservoir for fluid, an input piston, and a boost piston for augmenting an output force working in the bore, the boost piston being advanced in the bore in response to fluid pressure from the source pressurising a boost chamber in the bore behind the boost piston, pressurisation of the chamber by the fluid pressure being controlled by control valve means operative to shut off communication between the boost chamber and the exhaust port, and to open communication between the inlet port and the boost chamber following movement of the input piston in a brake-applying direction.

In most known boosters of the kind set forth considerable initial movement of the pedal is necessary to take up lost-motion in the braking system before the output force from the booster can be used to actuate brake-applying means. Lost-motion in a braking system includes not only clearances between mechanical parts in the system, but also elasticity in low stiffness parts, such as seals and hoses and any springs in a brake actuator.

One attempt at solving this problem is shown in British patent application No. 2 013 296, in which an input piston is incorporated for causing fluid under pressure to be applied to a face of the control valve means, causing a part of the control valve means to move relative to the input piston in a brake-applying direction, isolating the boost chamber from the exhaust port, and placing the boost chamber in fluid communication with the inlet port. The idea is that only a small initial pedal movement is required to cause the initial movement of the input piston, the rest of the lost-motion in the system being taken up by the movement of the part of the control valve means relative to the input piston. The part of the control valve means moves a fixed distance relative to the input piston, and this is designed to take up the lost-motion and to pressurise the braking system to a relatively low threshold level, so that further movement of the pedal is operative to apply the brakes. However, in any given booster due to manufacturing tolerances, all the lost-motion may not be taken up by the movement of the control valve means or the threshold level of pressurisation may be too high. Further, if a tandem master cylinder is used, and one of the circuits fails, the further lost-motion which is produced by the failure will, as with a conventional booster, have to be taken up by movement of the pedal. In the same way, any extra lost-motion caused by failure of an automatic brake adjuster will have to be taken up by movement of the pedal.

According to our invention in a pedal-operated booster of the kind set forth the control valve means comprises relatively movable parts including a bore and a valve mechanism housed in the bore, one part of the valve mechanism being movable relative to the input piston and having a pressure-responsive face, and operation of the control valve means being dependent on pressure in the braking system, the control valve means being operable on initial movement of the input piston in a brake-applying direction to cause the braking system to be pressurised to a threshold level and to cause fluid pressure to be applied to the pressure-responsive face to move the part of the valve mechanism relative to the input piston to place the boost chamber in communication with the inlet port.

Since operation of the control valve means is dependent on the pressure in the braking system, for any booster the operation of the control valve means pressurises the braking system to a threshold level which is such that lost-motion in the system is taken up, thus ensuring that further movement of the pedal will be operative to apply the brake.

Preferably the control valve means is operative to pressurise a chamber in the booster to a predetermined level in order to pressurise the braking system to the threshold level.

The control valve mechanism conveniently comprises a two-part valve assembly, comprising an outer sleeve member and an inner spool member which is the part provided with the pressure-responsive face. The control valve mechanism conveniently works in a bore in the boost piston.

In one construction of booster the control valve means is operable, on initial movement of the input piston, to cause pressurisation of the boost chamber to a predetermined level to act on the boost piston in order to pressurise the braking system to the threshold level.

In this construction the control valve mechanism as a whole is movable relative to the input piston, in response to the application of fluid pressure on initial movement of the input piston, until the predetermined level of pressure in the boost chamber, which is dependent on the reaction applied to the booster from the pressure in the braking system, has been reached. It is therefore possible to make the full stroke length of the control valve mechanism equal to the lost-motion produced when a master cylinder circuit has failed, for example, so that movement of the control valve mechanism relative to the input piston will be able to compensate for the extra lost-motion.

Conveniently, the control valve mechanism works in a control chamber to which fluid pressure from the inlet port is admitted on initial movement of the input piston, the pressure in the control chamber working on the valve mechanism to move it relative to the input piston to open communication between the inlet port and the boost chamber via the control chamber, and when the boost chamber is pressurised to the predetermined level the valve mechanism is operable to trap fluid in a part of the control chamber to prevent further relative movement between the input piston and the valve mechanism on further movement of the input piston in a brake-applying direction.

The valve mechanism may be arranged so that when the predetermined level of pressure in the boost chamber is reached the pressure in the control chamber acts on the pressure-responsive face of the part of the valve mechanism to overcome the force in a spring, and to move the part relative to the input piston to trap fluid in the control chamber. Conveniently the part moves in a brake-applying direction relative to the input piston.

The control chamber is preferably formed in the input piston, and the movement of the part of the valve mechanism preferably closes a valve on the control valve mechanism through which the control chamber can communicate with the inlet port.

However, although this construction has the advantage of a short overall length, it also has the disadvantage that the pressurisation of the boost chamber to the predetermined level does not always result in pressurisation of the braking system to a constant threshold level, with the result that the 'feel' of the braking system varies. This is because usually the inlet port is connected to the control valve means through a chamber formed round the boost piston between spaced seals, and since the force generated by the pressure in the boost chamber has to overcome the friction generated by these and other seals on the boost piston before it can act to pressurise the braking system and this friction will vary, depending on the pressure of the fluid supplied from the source.

Thus in a preferred construction an auxiliary pressure chamber is incorporated between the boost piston and an output piston, and on initial movement of the input piston the control valve means is operative to open communication between the auxiliary chamber and the inlet port to pressurise the auxiliary chamber to act on the output piston to pressurise the braking system, and at a predetermined level of pressure supplied to the auxiliary chamber an auxiliary valve closes to trap fluid in the auxiliary chamber, the control valve means then being operative to open communication between the boost chamber and the inlet port.

This construction means that the threshold level to which the braking system is pressurised is substantially constant, since the forces which have to be overcome before the braking system is pressurised depend on the characteristics of the auxiliary valve and seals for the auxiliary chamber, and these are constant for a given booster.

Preferably the auxiliary chamber is located within the boost piston. The auxiliary valve may comprise a valve member which is adapted to close when a predetermined pressure, which is dependent on the reaction applied to the booster from the pressure in the braking system, is supplied to the auxiliary chamber. The valve member may comprise a member biassed to closure by a spring, but held open by a spring-loaded auxiliary piston, the piston being responsive to the pressure supplied to the chamber to allow the valve to close when the predetermined pressure is reached.

In this construction one member of the control valve mechanism is coupled to the input piston, and only the part having the pressure-responsive face is movable relative to the input piston.

Closure of the auxiliary valve may result in the increase in pressure of the fluid applied to the pressure-responsive face, to move the part relative to the input piston to place the inlet port in communication with the boost chamber.

Alternatively, closure of the auxiliary valve acts directly on the part of the valve mechanism to move it in order to place the inlet port in communication with the boost chamber. In this case the auxiliary piston may be coupled to the part, so that the piston is provided with the pressure-responsive face, and movement of the piston in response to the predetermined level of pressure supplied to the auxiliary chamber to allow the auxiliary valve to close also moves the part relatively towards the input piston to place the inlet port in communication with the boost chamber.

Some embodiments of our invention are shown in the accompanying drawings, in which.

Figure 1:
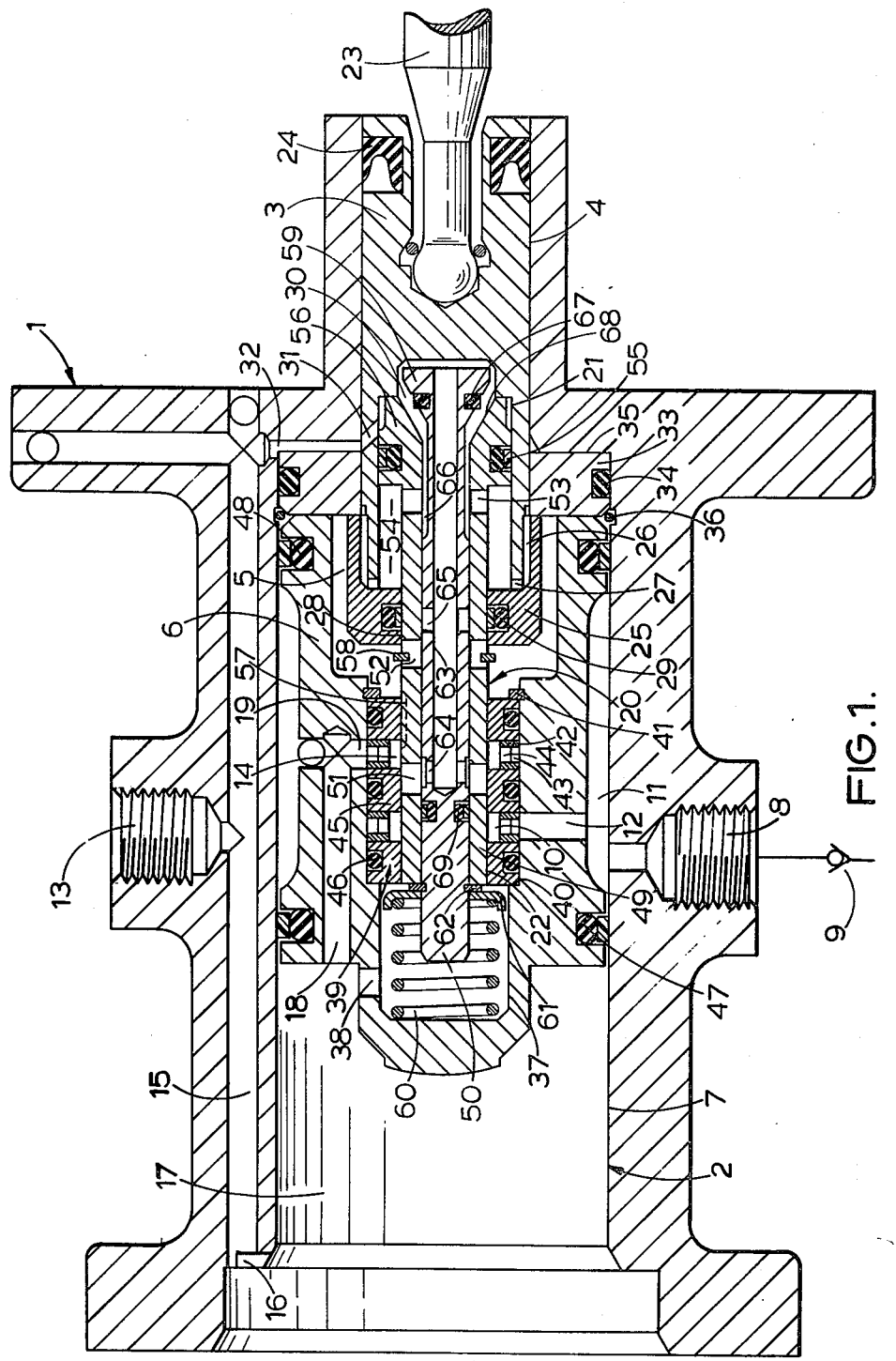
FIG. 1 is a longitudinal section through a pedal-operated booster showing the booster in a retracted position.

The booster shown in FIG. 1 comprises a housing 1 having a longitudinally extending stepped bore 2. An input piston 3 works in a portion 4 of the bore 2 of smaller diameter. A boost chamber 5 is defined between the input piston 3 and a boost piston 6 which works in a portion 7 of the bore 2 of larger diameter, the boost piston 6 being adapted to actuate a master cylinder, (not shown). An inlet 8 in the housing is connected to a source of hydraulic pressure, suitably an accumulator (not shown) through a one-way valve 9, and to an inlet port 10 in the boost piston 6 through a recess 11 and a radial passage 12 in the boost piston 6. Similarly, an exhaust port 13 in the housing 1 is connected to a reservoir for hydraulic fluid (not shown), and to an exhaust port 14 in the boost piston 6 through a cross-drilling 15 in the housing, a local cast recess 16 at the forward end of the housing a forward chamber 17 and axial and radial passages 18, 19 respectively, in the boost piston 6. A control valve mechanism 20 forming part of a control valve means works in bores 21, 22 defined in the input piston 3 and the boost piston 6 respectively.

Movement of a pedal (not shown) is transmitted to input piston 3 through an input rod 23, and the piston 3 is sealed at its outer end by a seal 24. The input piston 3 is provided with the bore 21 at its inner end, and is completed by a head 25 which has a screw-threaded connection 26 with the inner end of the piston 3. This screw-threaded connection is sealed by a seal 27 which may be of rubber, or a soft metal such as copper. The head 25 has an opening 28 in which the control valve mechanism 20 works, and the head 25 is provided with a seal 29 to define a control chamber 30 within the input piston 3. The input piston 3 is also provided with an inclined passage 31 which, in the position shown, provides communication between the control chamber 30 and the exhaust port 13 through a radial passage 32 and the cross-drilling 15. An annular cut-off member 33, sealed at 34, is retained between a shoulder 35 at the step in the bore 2, and a circlip 36 in the bore portion 7, such that a small movement of the input piston 3 in the brake-applying direction cuts off the passage 31 from the reservoir.

In the retracted position shown the boost piston 6 abuts the cut-off member 33. The boost piston 6 has a longitudinally extending stepped bore 37, closed at its inner end, but having a radial passage 38 in communication with the forward chamber 17. The boost piston 6 is also provided with a port assembly 39, which is retained in the boost piston 6 between a shoulder 40 at a step in the bore 37 and a circlip 41 on the boost piston 6, and which forms the bore portion 22 in which the control valve mechanism 20 works. The inlet and exhaust ports 10 and 14 of the port assembly 39 each comprise an annular member 42 having an external circumferential groove 43, from which radial passages 44 extend to the internal surface. These members 42 are located between annular sealing members 45 whose internal diameter is less than that of the members 42. The sealing members 45 each carry a seal 46 to prevent leakage between the ports 10 and 14. The boost piston 6 carries seals 47, 48 at each end.

The control valve means comprise the port assembly 39 and the control valve mechanism 20, which works in the bore portion 21, the opening 28 in the input piston 3 and in the port assembly 39 of the boost piston 6. The control valve mechanism is a two part assembly, comprising an outer, open-ended sleeve 49, and an inner spool 50, which is relatively movable with respect to the sleeve 49 through a limited distance. The sleeve 49 is provided with three spaced diametral ports. The first port 51, at the inner end of the sleeve 49, controls communication with the inlet port 10, or the exhaust port 14, the second intermediate port 52 is in communication with the boost chamber 5, and the third other port 53 is in communication with an annular space 54 formed in the control chamber 30 between the seal 29 on the piston head 25, and a seal 55 carried by an enlarged head 56 of the sleeve 49 working in the bore portion 21. The sleeve 49 is also provided with an external spiral recess 57 which controls communication between the exhaust port 14 and the boost chamber 5. A circlip 58 is also located on the external surface of the sleeve 49 at the second diametral port 52. The circlip 58 is able to engage with the port assembly 39, to limit movement of the sleeve 49 in a brake-applying direction, and to ensure that port 52 is constantly in communication with the boost chamber 5.

The inner spool 50 slides in the outer sleeve 49, and is a one-piece member, having a conical head portion 59 at its outer end. The sleeve 49 and the spool 50 are urged rearwardly by a spring 60, acting between the inner end of the boost piston 6 and a plate 61 which abuts a circlip 62 provided adjacent the inner end of the spool 50, the circlip 62 being in abutment with the sleeve 49. The spring 60 determines the level to which the boost chamber 5 is pressurised by movement of the control valve mechanism 20. The spool 50 is provided with an axially extending blind bores 63 open at the outer end to the control chamber 30. A first diametral port 64 at the inner end controls communication between the bore 63 and the first port 51 on the sleeve 49, a second diametral port 65 controls communication between the bore 63 and the port 52 on the sleeve 49, and an external annular recess 66 provides communication between the port 53 on the sleeve 49 and the control chamber 30. The conical head portion 59 of the spool is provided with a seal 67 which is able to seat on a corresponding conical surface 68 on the sleeve 49, to trap a volume of fluid in the annular space 54. The spool 50 is also provided with a seal 69 forward of the first port 63.

In the inoperative position shown in FIG. 1, all the parts are retracted, so that the control chamber 30 is connected to the reservoir through the inclined passage 31 and the radial passage 32, and also through the bore 63, and the ports 64 and 51 to the exhaust port 14. The boost chamber 5 is also connected to the exhaust port 14 through the spiral recess 57 in the sleeve 49.

When the brakes are to be applied, the pedal is depressed, and the rod 23 transmits the movement to the input piston 3. The input piston 3 acts on the sleeve 49 directly, and the sleeve 49 acts on the spool 50 through the circlip 62, so that all three initially move together, against the force in the spring 60. Initial movement will cause the spiral recess 57 on the sleeve 49 to cut off communication between the boost chamber 5 and the exhaust port 14. The boost chamber 5 is therefore isolated at reservoir pressure. Simultaneously the inclined passage 31 is moved into engagement with the cut-off member 33, to cut off communication between the control chamber 30 and the reservoir through the passage 32. This movement also connects the first sleeve port 51 with the inlet port 10, to allow pressure fluid to flow through the port 64 and the bore 63 into the chamber 30, and through recess 66 and the third sleeve port 53 into the annular space 54.

The pressure in control chamber 30 acts over the whole area of the control valve mechanism 20 against the force in the spring 60, and when the pressure is sufficient, both the sleeve 49 and the spool 50 start to move in a brake-applying direction, and relative to the input piston 3. The circlip 58 on the sleeve 49 will engage with the port assembly 39, which prevents the sleeve 49 moving further. The pressure in the chamber 30 continues to rise, and acts over a reduced area of the control valve mechanism, the spool 50, and causes it to move forwards against the force in the spring 60, and relative to the sleeve 49 and the input piston 3. The second spool port 65 is brought into communication with the second sleeve port 52, and with the boost chamber 5. Fluid from the inlet port 10 can thus flow into the boost chamber 5. At first, the opening of the port 65 with the port 52 will be small, due to the pressure redution in the chamber 30 caused by opening port 65 via port 52 to the boost chamber 5, but gradually the pressure in the boost chamber increases, and the port 65 opens fully to the port 52.

Figure 2:
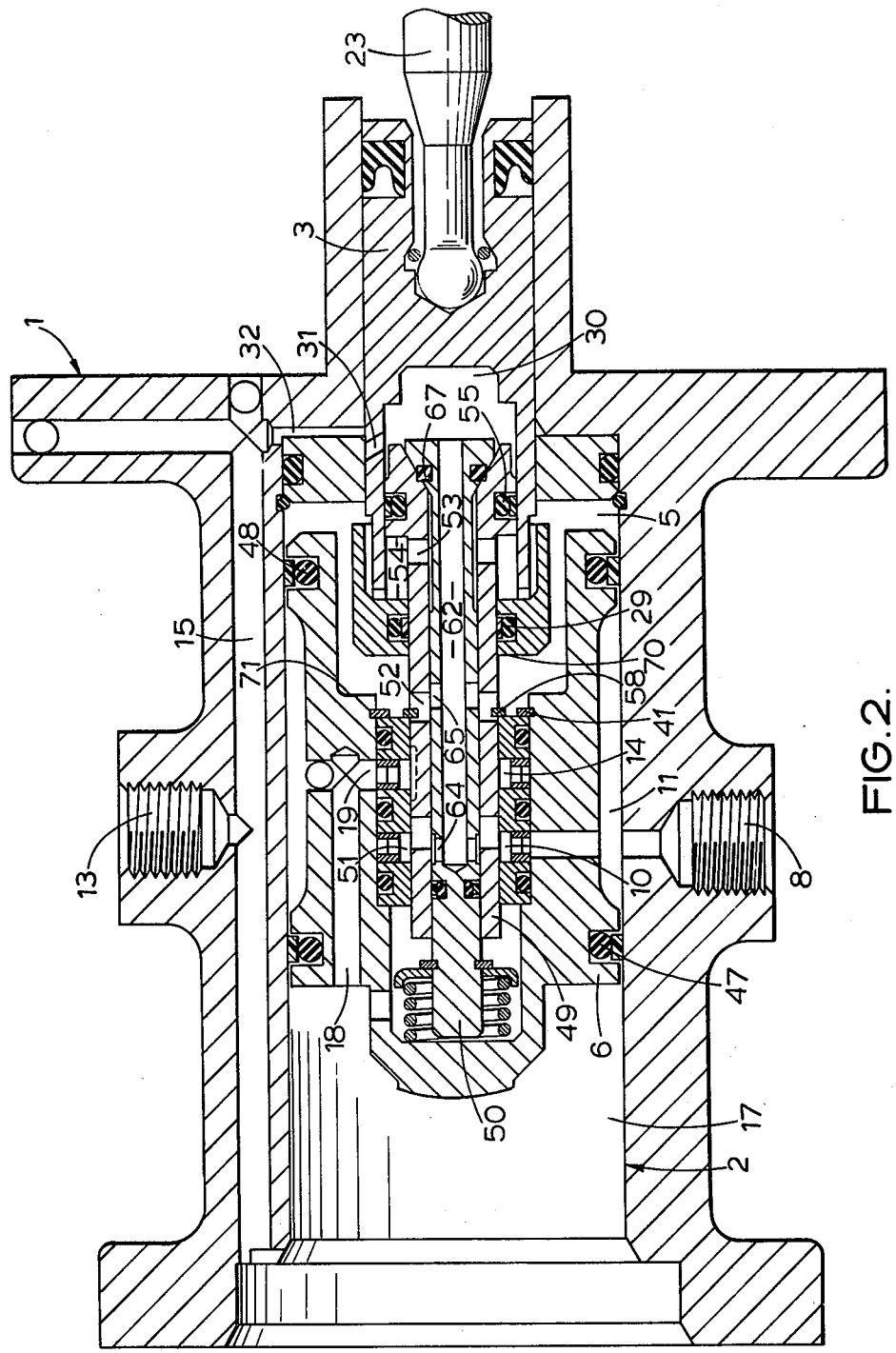
FIG. 2 shows the booster of FIG. 1 in one stage of actuation.

Pressurisation of the boost chamber 5 will therefore move the boost piston 6 to start pressurisation of the braking system. The sleeve 49 and the spool 50 will also move with the boost piston due to pressure in chamber 30. Pressurisation of the braking system is initiated by cutting off communication between the first master cylinder pressure space and the reservoir. This pressurisation creates a reaction force from the master cylinder which causes the pressure in the boost chamber 5, and the control chamber 30 to increase. When the pressure in the boost chamber 5 reaches a level, determined by the force of the spring 60 and the cross-sectional area of the spool 50, the seal 67 on the head 59 of the spool 50 will close onto the conical portion 68 of the sleeve 49, trapping a volume of fluid in the annular space 54. The sleeve 49 cannot now move forwards relative to the input piston 3. This stage in the actuation is shown in FIG. 2. Clearly, the control valve mechanism 20 will move relative to the piston 3 until a predetermined pressure is present in the boost chamber 5 which is dependent on the pressure in the braking system. This predetermined pressure is chosen to correspond to a pressure in the braking system at which substantially all the lost-motion will have been taken up.

If the input piston 3 has not been moved further, the pressure in the boost chamber will cause the boost piston 6 to move slightly further forwards relative to the control valve mechanism 20, until the inlet port 10 is closed off from the first sleeve port 51, which is the "hold" or equilibrium position.

Figure 3:
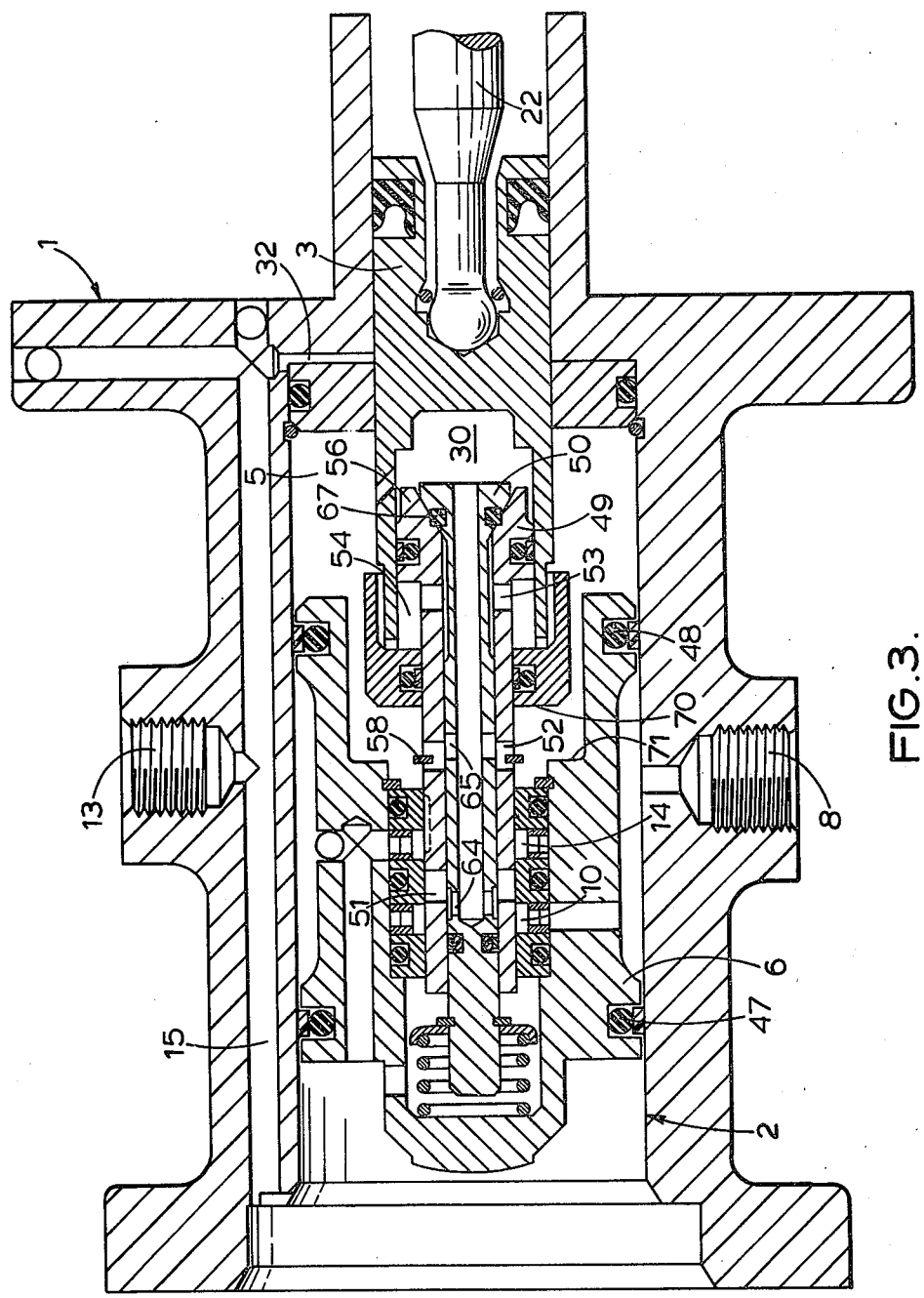
FIG. 3 shows of the booster of FIG. 1 in a further stage of actuation.

If the input piston 3 is moved further in a brake-applying direction, the piston will move together with the control valve mechanism 20, the re-establish communication between the inlet port 10 and the first sleeve port 51, to admit pressure fluid to the boost chamber 5, causing the same movement of the boost piston 6 as of the input piston 3, since there is no lost-motion to take up. This stage of actuation is shown in FIG. 3. If the force on the input piston 3 is now held constant, the booster will move into the equilibrium position described above.

If the force on the input piston 3 is reduced, the boost pressure acts on the input piston 3 to move it rearwardly, and the control valve mechanism 20 will also move rearwardly with the piston 3, until the sleeve 49 returns to the position relative to the port assembly 39 shown in FIG. 1, in which the boost chamber 5 is connected to the exhaust port 14 via the spiral recess 57. The pressure in the boost chamber will decrease, but fairly slowly, as the reduction of boost pressure will cause the boost piston 6 to move rearwardly due to the reaction from the master cylinder, and the communication between the exhaust port 14 and the boost chamber 5 will therefore be alternately opened and closed. The boost piston 6 will return to the position shown in FIG. 2.

If the force on the input piston 3 is relieved altogether, the input piston 3 is moved rearwardly by the pressure in the chamber 30, the pressure remaining in the boost chamber 5, and the force in the spring 60. When the inclined passage 31 again establishes communication with the reservoir, the pressure in chamber 30 is reduced, and the spring 60 returns the sleeve 49, the spool 50, and if necessary, the piston 3 to their retracted positions.

Normally, the pressure in the boost chamber 5 which is required to produce maximum retardation will be less than even the cut-in pressure of the accumulator. However, if a greater force is applied to the input piston 3, the pressure in the boost chamber 5 will rise. If the force applied to the pedal is sufficiently large, the boost pressure will equal the pressure in the accumulator. Further movement of the input piston 3 will cause the piston 3 to displace fluid into the boost chamber 5, and the boost piston 6 will continue to move forward, but the movement of the boost piston will be less than the movement of the input piston. The input piston 3 will therefore gradually catch up the boost piston 6. First, however the circlip 58 will engage with the port assembly 39, so that further movement of the input piston 3 moves that piston forwards relative to the control valve mechanism 20. The fluid trapped in space 54 will therefore expand, causing a temporary vacuum. The inner face 70 on the piston head 25 will contact the face 71 on the boost piston 6, and for any further movement of the input piston 3, the output force will increase proportionally to the input force.

If the source of hydraulic pressure fails, the control valve mechanism 20 will be unable to move relative to the input piston 3, so that further movement of the input piston 3 will cause the face 70 on the head 25 to engage with the face 71 of the boost piston 6 to actuate the master cylinder directly.

Clearly, if a circuit of a master cylinder fails during the initial movement of the input piston 3, the control valve mechanism will be operative to take up the extra lost-motion created. However, if a circuit fails when the booster is in the position shown in FIG. 3, the decrease in reaction force from the master cylinder which will be felt at the pedal, will also decrease the pressure in the boost chamber to enable the seal 67 of the spool 50 to disengage from the surface 68, so that the control valve mechanism is able to operate to compensate for the extra lost-motion.

The seal 24 on the input piston 3 must be leakproof, and is therefore made of a suitable elastomeric material, preferably rubber. However the remaining moving seals, such as 47, 48 on the boost piston 6, 29 on the input piston 3, and 55 and 69 on the spool 50, need not be leakproof, since they have fluid on each side of them. Conveniently therefore, these seals may be of a non-elastomeric low-friction material, such as polytetrafluoroethylene (P.T.F.E.) which reduces the sliding friction of the seals, and therefore the hysteresis of the booster.

Figures 4, 5:
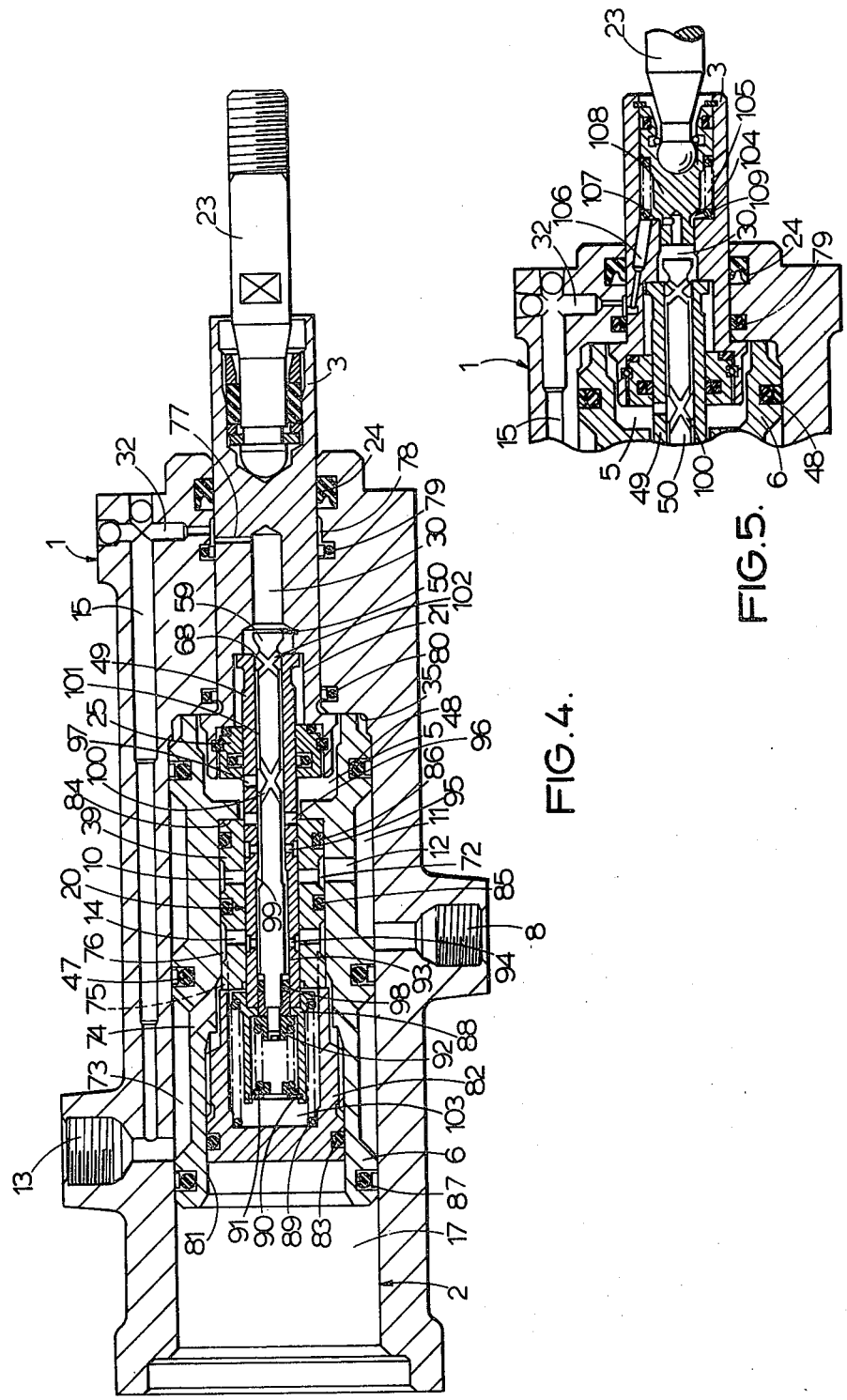
FIG. 4 is a view similar to FIG. 1, but showing a modification.
FIG. 5 is a fragmentary section of the booster of FIG. 4 showing a modification.

FIG. 4 shows a modifications of the booster of FIGS. 1 to 3, and corresponding reference numerals have been applied to corresponding parts. The modifications only are described below.

In the booster of FIG. 4 the inlet 8 in the housing 1 is connected to the inlet port 10 in the port assembly 39 through the recess 11, the radial passage 12 in the boost piston 6, and an annular recess 72 in the port assembly 39. The exhaust port 13 in the housing is connected to the exhaust port 14 in the port assembly 39 through a further annular recess 73 and inclined passages 74 in the boost piston, and axial passages 75 and annular recess 76 in the port assembly 39. The forward chamber 17 is not connected to the reservoir through the exhaust port 13.

The construction of the input piston 3 is similar to that of FIG. 1, but the inclined passage 31 is replaced by a radial passage 77 connected through an annular recess 78 in the housing to the passage 32 and the cross-drilling 15. The cut-off member 33 is omitted, and a seal 79 is provided to cut off communication between the passage 77 and the recess 78 on movement of the input piston 3 in a brake-applying direction. A further seal 80 is provided to seal the passage 77 from the boost chamber 5 when movement of the input piston carries the passage past the seal 79.

In its retracted position the boost piston 6 abuts the shoulder 35 in the housing 1. The boost piston 6 has a longitudinally-extending stepped through bore 81, with a cup-shaped closure member 82 which is screwed into the bore 81 to close it at its forward end, and is sealed from the chamber 17 by a seal 83. The port assembly 39 comprises a one-piece sleeve member, provided with the diametral ports 10 and 14 and the recesses 72, 76, which is retained between the closure member 82 and a shoulder 84 at a step in the bore 81. The port assembly has seals 85, 86 to prevent leakage between the ports 10, 14 and the boost chamber 5. The boost piston 6 also has an additional seal 87 to seal the recess 73 from the chamber 17.

The control valve mechanism 20 again comprises an outer sleeve 49 and an inner spool 50. At its forward end the sleeve 49 engages an abutment member 88, and the sleeve 49 is biassed rearwardly by a spring 89 acting between the abutment member 88 and the closure member 82. The abutment member 88 is provided with a circlip 90, and a second spring 91 acts between the circlip 90 and a spool abutment member 92 engaging the spool 50 to urge the spool 50 rearwardly.

The sleeve member 49 has a stepped bore 93 and three sets of diametral ports. The first diametral port 94 at the forward end of the sleeve controls communication with the exhaust port 14, the second diametral port 95 controls communication with the inlet port 10, and the third diametral port 96 controls communication with the boost chamber 5. A further radial port 97 is always in communication with the boost chamber 5.

The spool 50 is of stepped outline and works in the bore 93. At its forward end the spool 50 carries a seal 98 which seals the abutment member 92 to the spool, as well as sealing the spool in the bore 93. Rearwardly of the seal 98 the spool 50 is provided with a first external annular recess 99, which is connected, through cross-holes 100 to a second annular recess 101, which in turn is connected through cross-holes 102 to the bore 93 and the control chamber 30 through a valve formed by the head 59 of the spool 50, which is able to seat on a seating portion 68 of the sleeve 49 to trap fluid in the control chamber 30.

In the inoperative position shown in FIG. 4 all the parts are retracted, so that the boost chamber 5 is connected to the exhaust port 13 through the port 96, recess 99, ports 94, 14 and passages 76, 75, 74 and recess 73. The boost chamber 5 is also connected to exhaust port 13 through port 69, recess 99, cross-holes 100, recess 101, cross-holes 102, chamber 30, and passages 77, 78, 32 and 15. The chamber 103 defined by the closure member 82 is also connected to the exhaust port 13 through passage 75.

When the brakes are to be applied, the rod 23 transmits pedal movement to the input piston 3, which acts on the sleeve 49, and on the spool 50 through the sleeve 49 and the abutment members 88, 92 so that all three move together. Initial movement cuts off communication between the boost chamber 5 and the exhaust port 13 via the ports 96 and 94. Simultaneously the passage 77 is moved to cut off communication between the chamber 30 and the exhaust port 13. Then the sleeve 49 moves to connect port 95 to the inlet 10, to allow pressure fluid to flow into the chamber 30 via recess 99, holes 100, recess 101 and holes 102.

The pressure in the control chamber 30 acts on the sleeve 49 and the spool 50, moving them against the force in the spring 89, and starts to increase. At a given pressure in the chamber 30 the force exerted on the spool 50 is sufficient to enable it to move against the force in the spring 91, and relative to the input piston 3, to put the recess 101 in communication with the port 97, to connect the boost chamber 5 to the inlet port 10. At first the opening of the port 97 with recess 101 will be small, due to the pressure reduction in the chamber 30 caused by its connection to the boost chamber 5, but as the pressure in the boost chamber 5 increases the port 98 opens fully to the recess 101.

Pressurisation of the boost chamber 5 moves the boost piston 6 to start pressurisation of the braking system, and the valve mechanism 20 moves with it due to pressure in chamber 30. As in FIG. 1, when the reaction from the braking system increases the pressure in the boost chamber 5 to a level, also present in chamber 30, determined by the force in the spring 91 and the area of spool 50, the spool 50 moves forwardly to close the head 59 onto the seat 68, trapping fluid in chamber 30 which prevents forward movement of the valve mechanism 20 relative to the input piston 3.

The remainder of the brake-applying cycle is the same as that of FIG. 1, with pressurisation of the boost chamber 5 controlled by the control valve means in response to relative movement of the input piston and the boost piston.

When the force on the input piston 3 is reduced, pressure in the boost chamber 5 acts to move the piston 3 and the valve mechanism 20 rearwardly, until the sleeve port 94 connects with the exhaust port 14, and the boost chamber 5 is connected to the exhaust port via port 97, recess 99 and port 94. Decrease of pressure in the boost chamber 5 causes the piston 6 to move rearwardly, resulting in alternate opening and closing of communication between the boost chamber 5 and the exhaust port 14 until an equilibrium position is reached.

Relieving the force on the input piston 3 altogether causes it to be moved rearwardly by the boost chamber pressure, and the spring 89, when the passage 77 connects with the reservoir again, the pressure in control chamber 30 is reduced, and the springs 89 and 91 return the sleeve 49 and spool 50 to their retracted positions.

If the pressure in the boost chamber 5 equals the pressure in the accumulator due to a large force on the pedal, the input piston 3 will move towards the boost piston 6, and the abutment member 88 will contact the closure member 82, so that for further movement of the input piston 3, the input force will be transmitted mechanically through the fluid in chamber 30 and the valve mechanism 20 to the boost piston 6.

The operation of the control valve means to take up lost-motion when a master cylinder circuit fails is similar to that of FIG. 1.

FIG. 5 shows a modification of the booster of FIG. 4, and corresponding reference numerals have been applied to corresponding parts.

In FIG. 5 the length of the booster is reduced by reducing the length of the input piston 3. In the retracted position shown the control chamber 30 is connected to the passage 32 through a valve 104 controlling communication with a chamber 105, which is connected to recess 78 by an inclined passage 106. The valve 104 comprises a valve seat 107 on the input piston 3, which cooperates with a valve member 108 connected to the input rod 23. The valve member 108 is biassed rearwardly by a spring 109 acting between the input piston 3 and the valve member 108. The construction of the remainder of the booster is the same as that of FIG. 4.

In operation, initial movement of the input rod 23 is transmitted to the input piston 3 through the spring 109 to operate the booster as described in relation to the booster of FIG. 4. Further movement of the input rod 23, once the spool 50 has closed on the sleeve 49 to trap fluid in chamber 30, gradually overcomes the force in the spring 109 to close the valve 104, so that movement of the rod 23 is then transmitted through the valve member 108 to the input piston 3. Operation of the booster is thereafter the same as that described in relation to FIG. 4. On brake release the spring 109 will open the valve 104 to allow the chamber 30 to be connected to reservoir.

In the construction of FIGS. 1 to 5 pressurisation of the boost chamber 5 to the predetermined level may not always result in pressurisation of the braking system to a constant threshold level, since the force generated by the pressure in the boost chamber has to overcome the friction generated by the seals on the boost piston 6 before it can act to pressurise the braking system, and this friction will vary, depending on the pressure of the fluid supplied from the accumulator.

Further embodiments of our invention shown in FIGS. 6 to 11 are designed to overcome this disadvantage. Where appropriate, corresponding reference numerals have been applied to parts corresponding to those of FIGS. 1 to 5.

Figure 6:
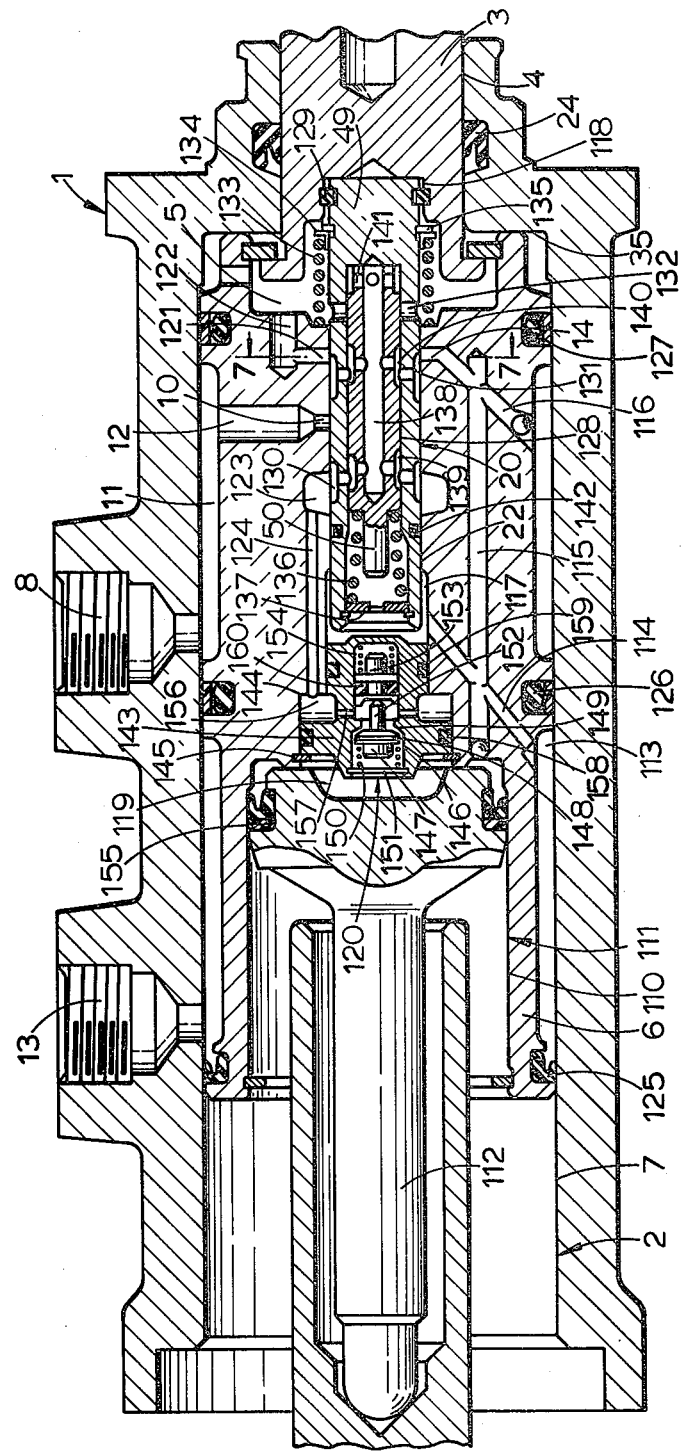
FIG. 6 is a longitudinal section through a further booster in a retracted position.
Figure 7:
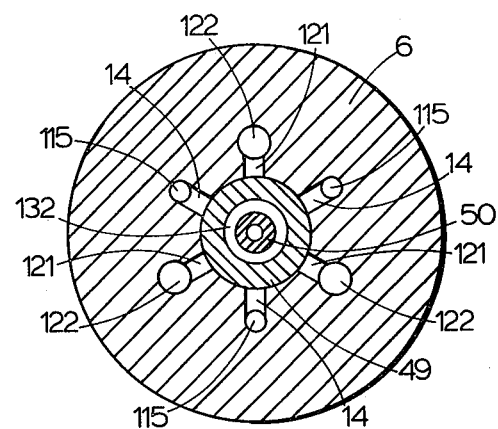
FIG. 7 is a section along the line 7—7 of FIG. 6.

The booster shown in FIGS. 6 and 7 has the input piston 3 and the boost piston 6 working in the stepped bore 2 in the housing 1, with the boost chamber 5 defined between them. In a larger diameter portion 110 of a stepped through bore 111 of the boost piston 6 works an output piston 112, which is adapted to actuate a master cylinder (not shown). The inlet 8 in the housing is connected to a source of hydraulic pressure, suitably an accumulator (not shown) and to the inlet port 10 in the boost piston 6 through the annular recess 11 and the radial passage 12 in the boost piston 6. Similarly, the exhaust port 13 in the housing is connected to a reservoir for hydraulic fluid (not shown) and to the exhaust port 14 in the boost piston 6 through an annular recess 113, an inclined passage 114, axial passage 115 and inclined passage 116 in the boost piston 6. The inclined passage 114 also provides communication between a portion 117 of the bore 111 and the exhaust port 13 via the annular recess 113. A control valve mechanism 20 is located in a portion 22 of the bore 111 of intermediate diameter and in a blind bore 118 in the input piston 3. An auxiliary pressure chamber 119 and an auxiliary valve 120 are also located in the bore 111 of the boost piston 6.

The input piston 3 is actuated by movement of a pedal (not shown), and the piston 3 is sealed in the bore portion 4 by the seal 24.

In the retracted position shown the boost piston 6 abuts the rear end 35 of the housing. The boost piston 6 is provided with a port 121 which is in communication with the boost chamber 5 through an axial passage 122. The port 121 is opposite the exhaust port 14, and as shown in FIG. 7, there are three ports 121 and three ports 14 equiangularly spaced round the bore portion 22 to prevent the control valve mechanism 20 jamming in the bore 22. A further recess 123 in the boost piston 6 leads to a passage 124 which provides communication with the auxiliary chamber 119. The boost piston 6 also carries seals 125, 126, 127.

The control valve mechanism 20 is a two-part assembly comprising an outer sleeve member 49 which is provided with a blind bore 128 in which an inner spool member 50 works. The rearward end of the sleeve 49 is located with clearance in the bore 118 of the input piston 3 by a circlip 129, and is also provided with three axially spaced ports. The first port 130 at the forward end of the sleeve 49 is in communication with the recess 123 in the boost piston 6. The second intermediate port 131 controls communication with the inlet port 10 or the exhaust port 14, and also controls communication between the port 121 and the exhaust port 14, to control communication between the boost chamber 5 and the exhaust port 13. The third port 132 is in communication with the boost chamber 5. A spring 133 acting between the boost piston 6 and an abutment member 134 held by a circlip 135 on the sleeve member 49 biasses the sleeve member 49 rearwardly.

The inner spool member 50 slides in the bore 128, and is urged rearwardly by a spring 136 acting against an abutment member 137 located adjacent the open end of the bore 128. The spool 50 is provided with an axially extending blind bore 138 which opens rearwardly. A first diametral port 139 at its forward end controls communication between the bore 138 and the first port 130 on the sleeve 49, a second diametral port 140 controls communication between the bore 138 and the intermediate port 131 on the sleeve 49, and a third diametral port 141 at the rearward end controls communication between the bore 138 and the third sleeve port 132. The sleeve 49 also carries at its forward end a seal 142 to separate the bore portion 117, which is in communication with the exhaust port 13, from the ports in the control valve mechanism.

A member 143 is also disposed in bore 111 of the boost piston 6 forward of the control valve mechanism. The member 143 is located between a shoulder 144 at a step in diameter of the bore 111 and a circlip 145, and houses the auxiliary valve 120. The valve 120 is located in an axially extending bore 146 in the member 143, and comprises a valve member 147 provided with a seal 148 adapted to seat on a conical portion 149 of the bore 146. The valve member 147 is biassed to closure by a spring 150 acting against an abutment member 151 at the forward end of the bore 146, and is also provided with a rearward extension 152 which engages a piston 153 located at the rearward end of the bore 146. The piston 153 is biassed forwardly by a spring 154, which is stronger than spring 150, into engagement with the extension 152 on the valve member 147 to keep the valve 120 open. The auxiliary chamber 119 is defined between the seal 148 on the valve member 147 and a seal 155 between the output piston 112 and the portion 110 of the bore 111 of the boost piston 6. Fluid communication to the auxiliary chamber 119 is provided through an annular recess 156 in the member 143, which is in communication with the passage 124 in the boost piston 6, radial passages 157 and through the auxiliary valve 120. The member 143 also carries seals 158 and 159 to seal the recess 156 from the auxiliary chamber 119 and the bore portion 117 respectively. A seal 160 on the valve piston 153 also seals the recess 156 from the bore portion 117.

In the inoperative position shown in FIG. 6 all the parts are retracted, and the boost chamber 5 and the auxiliary chamber 119 are connected to the exhaust port 13. The bore portion 117 is also connected to the exhaust port 13.

When the brakes are to be applied movement of the pedal is transmitted through an input rod to the input piston 3. The input piston 3 acts on the sleeve 49, which acts on the spool 50 so that all three initially move together against the force in the spring 133. Initial movement causes the intermediate port 131 of the sleeve 49 to move out of registry with the ports 14 and 121, cutting off communication between the boost chamber 5 and the exhaust port 13 so that the boost chamber 5 is isolated at reservoir pressure. Then communication is opened between the port 131 and the inlet port 10 which allows pressure fluid to flow to the auxiliary chamber 119 through the port 140, bore 138, ports 139 and 130, recess 123, passage 124, recess 156, passages 157 and the open valve 120.

Pressure in the auxiliary chamber 119 acts on the output piston 112 which moves forwardly to actuate the master cylinder to start pressurisation of the braking system. Initially the pressure supplied to the auxiliary chamber 119 will be relatively low, but as the braking system pressurises a reaction is fed back through the output piston 112, which increases the pressure of the chamber 119. The forward end of the valve piston 153 is also subjected to this pressure and at a predetermined value, corresponding to the required threshold level of pressure in the braking system, the pressure acting on the piston 153 overcomes the force in the spring 154, and piston 153 moves rearwardly, allowing the auxiliary valve 120 to close, and trapping fluid in the auxiliary chamber 119 which subsequently acts as an hydraulic strut.

The closure of the valve 120 causes the pressure of the fluid flowing through the control valve means to increase, and at a second predetermined pressure the pressure acting on the rear end of the spool 50 overcomes the force in the spring 136, and the spool 50 moves forwardly, putting the port 141 into communication with the port 132 and allowing pressure fluid to flow into the boost chamber 5. Since the full area of the boost piston 6 is greater than that of the output piston 112, while the reaction load from the master cylinder is unchanged, the boost chamber 5 is supplied with fluid at a pressure lower than the pressure of the fluid trapped in chamber 119. Thus the valve 120 is subjected to a pressure differential which holds it closed. As the boost piston 6 is advanced due to pressurisation of the boost chamber 5 the inlet port 10 will move out of registry with the port 131 to shut off communication between the boost chamber 5 and the inlet port, if the input piston 3 has not been moved past the initial stage. The booster is then in the "hold" or equilibrium position.

If the input piston 3 is moved further in a brake-applying direction the piston 3 and the control valve means will move together to re-establish communication between the inlet port 10 and the intermediate sleeve port 131 to admit fluid to the boost chamber 5. If the force on the input piston is now held constant the booster will move into the equilibrium position described above, and the boost chamber pressure will act over the area of the input piston 3 to provide the reaction load or "feel" to the pedal. The pressure in the auxiliary chamber 119 will rise and fall with the pressure in the boost chamber 5, but will be at a higher level determined by the ratio of the areas of the pistons 6 and 112. Leakage of the higher pressure fluid out of chamber 119 past the valve 120 or the seal 155 will however only result in increased piston travel and will not affect the operation of the booster adversely.

If the force on the input piston 3 is reduced, the input piston and the control valve mechanism will move rearwardly until the port 131 of the sleeve 49 comes into registration with the ports 14 and 121, allowing fluid to flow from the boost chamber 5 to the exhaust port 13 via passage 122, ports 121, 131 and 14 and passages 113, 114, 115 and 116 and also via ports 132, 141 and 140. When the pressure in the boost chamber 5 has fallen to a level where the reaction it applies to the input piston 3 is below the force applied to the piston 3 from the pedal, the booster moves back into the equilibrium position.

If the force on the input piston 3 is relieved altogether, the boost chamber 5 will be connected to the exhaust port 13, as described above, until the spring 136 is able to urge the spool 50 rearwardly to close communication between the ports 132 and 141, but the boost chamber 5 will still be connected to the exhaust port 13 via passage 122 and ports 121, 131 and 14. The boost pressure will continue to decrease until the spring 154 moves the valve piston 153 to open the valve 120 against the spring 150 and the pressure in the chamber 119. The fluid from chamber 119 then flows to the exhaust port 13 via the control valve mechanism 20.

Clearly, if a master cylinder circuit fails when the booster is in an inoperative position, or during initial movement of the input piston 3 the control valve mechanism 20 is operative to take up the extra lost-motion created. If a circuit fails when the booster is operative, then the decrease in the reaction force will case a decrease in pressure in the auxiliary and boost chambers, which enables the auxiliary valve 120 to re-open, so that the control valve mechanism can operate to compensate for the extra lost-motion.

By pressurising the auxiliary chamber 119 to start pressurisation of the braking system, this embodiment ensures that the threshold level of pressure in the braking system is substantially constant, as the forces which have to be overcome before the braking system starts to be pressurised depend only on the characteristics of the auxiliary valve 120, and the seals for the auxiliary chamber 119, which are substantially constant for a given booster.

Figure 8:
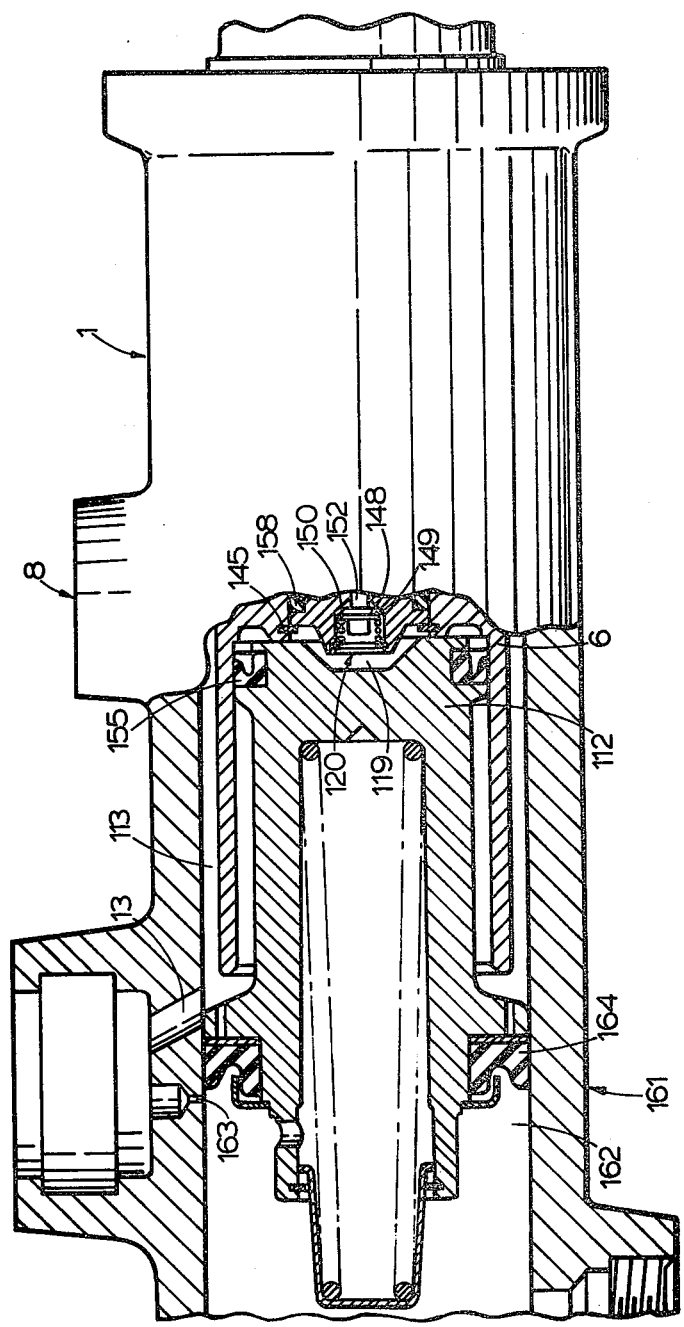
FIG. 8 is a fragmentary section of the booster of FIG. 6 showing it combined with a master cylinder.

FIG. 8 shows a modification of the booster of FIG. 6 in which the booster is combined with a master cylinder 161, and the output piston 112 also acts as the piston of the master cylinder 161. The booster and the master cylinder share a common reservoir, from which a master cylinder pressure space 162 is supplied through a recuperation port 163. Initial movement of the piston 112 moves a seal 164, which also performs the function of seal 125 in FIG. 6, to cut off communication between the space 162 and port 163 to start pressurising the braking system. The construction and operation of the embodiment of FIG. 8 is otherwise the same as that of FIGS. 6 and 7.

Figure 10:
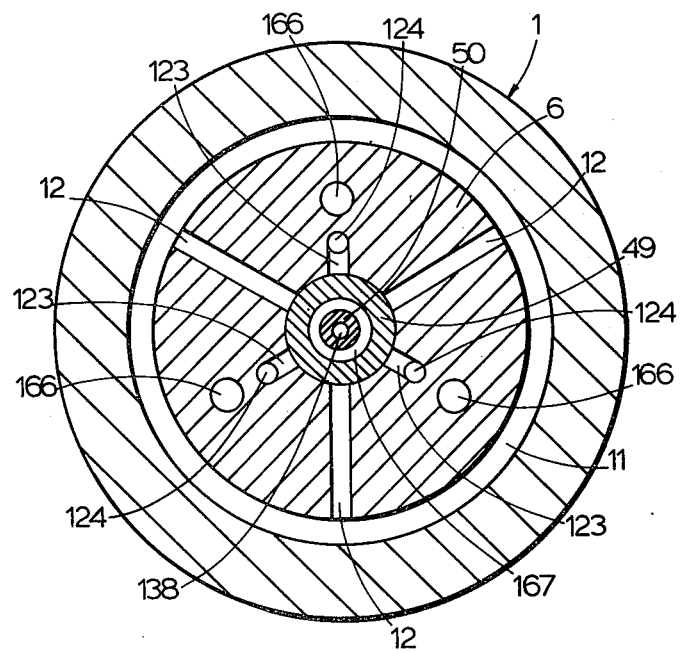
FIG. 10 is a section along the line 10—10 of FIG. 9.
Figure 9:
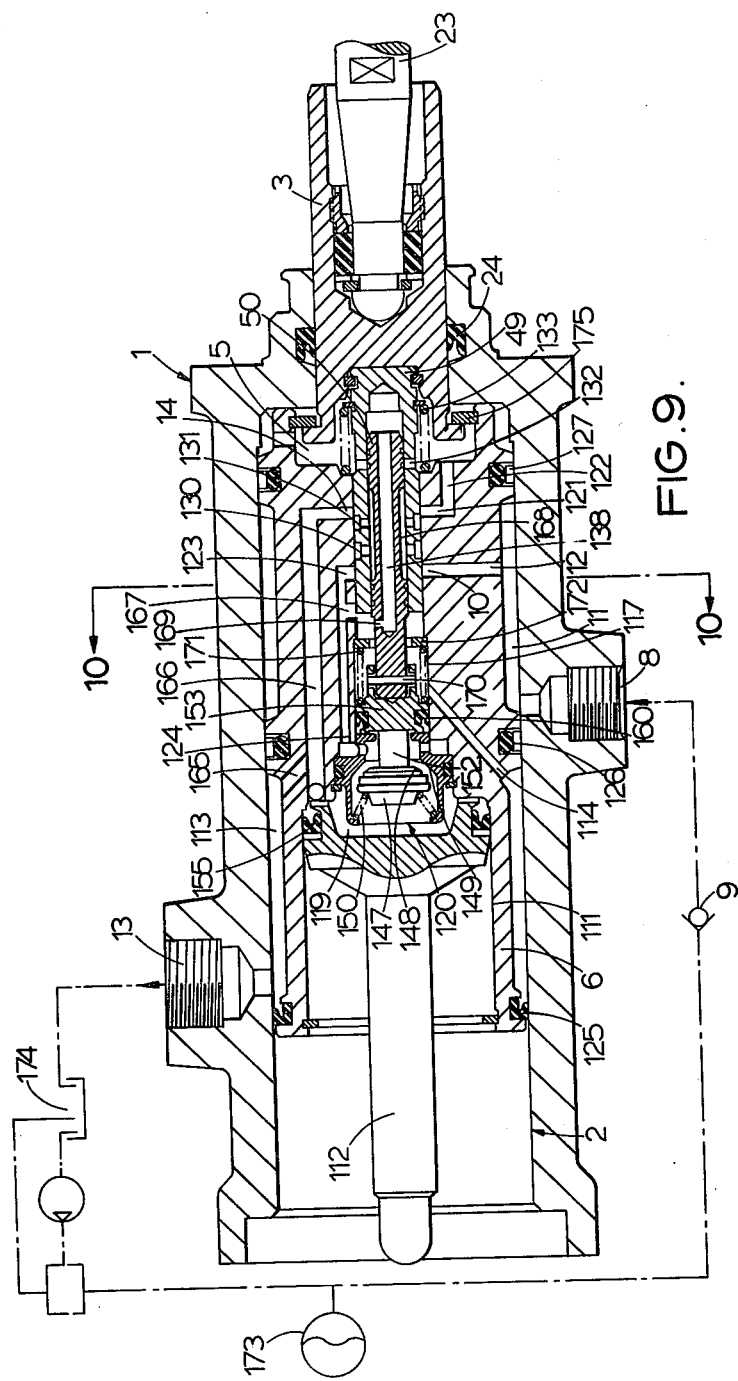
FIG. 9 is a view similar to FIG. 6 but showing a modification.

FIGS. 9 and 10 also show a modification of the booster of FIG. 6 in which the arrangement of the spool and the auxiliary valve are modified, and corresponding reference numerals have been applied to corresponding parts.

In the modification of FIGS. 9 and 10 the inlet port 10 is disposed in the same axial plane as the port 1, and as can be seen in FIG. 10 there are in fact three ports 10 and three ports 123 equiangularly spaced round the sleeve 49 to avoid jamming of the sleeve 49 in the bore 22. The exhaust arrangement is also modified, with the port 14 connected to the recess 113 by inclined passage 165 and axial passage 166 instead of 115 and 116, while bore portion 117 only is supplied by passage 114. On the sleeve 49 the first port 130 controls communication with the ports 123 and 10 while the second port 131 controls communication between the port 121 and the exhaust port 14. The third port 132 as before is in communication with the boost chamber 5. The sleeve 49 also controls a port 167 controlling communication between passage 124 and bore portion 117. The spool 50 itself is modified, and the three ports 139, 140 and 141 are all combined into an annular recess 168, which is not in communication with the blind bore 138. Instead the bore 138 is provided with a further radial port 169 which opens into the bore portion 117, so that the bore 138 is always in communication with the exhaust port 13. In this embodiment the spring 136 is omitted, and the spool 50 is instead located at its forward end in a blind bore in the valve piston 153 by a pin 170.

The arrangement of the auxiliary valve 120 is also modified, with the valve piston 153 working in the bore 111 of the boost piston 6 instead of the bore 146 in the member 143. The valve piston 153 is biassed into engagement with the valve member extension 152 by a spring 171 acting against an abutment 172 in the bore portion 117.

The connection of the booster to an accumulator 173 and the reservoir 174 is also shown.

In the inoperative position shown all the parts are retracted, and the input piston 3 abuts against a circlip 175 on the boost piston 6. The boost chamber 5, the auxiliary chamber 119 and the bore portion 117 are all connected to the exhaust port 13.

When the brakes are to be applied the input piston 3 is moved by the pedal, and also moves the sleeve 49, but not the spool 50. Initial movement cuts off the port 131 from the ports 14 and 121, cutting off the boost chamber 5 from the exhaust port 13 and closes port 167 to cut off communication between passage 124 and bore portion 117. Further movement brings the port 130 into registry with the ports 10 and 123, allowing fluid to flow from the inlet port 10 along passage 124, and through the valve 120 to the auxiliary chamber 119. Pressure fluid will also flow into the annular recess 168 of the spool 50. As in FIG. 6, when the pressure increases in the pressure chamber 119 the valve piston 153 moves rearwardly to allow the valve 120 to close, and this also moves the spool 50 rearwardly to put the inlet port 10 into communication with the boost chamber 5 through the port 130, recess 168 and port 132. The boost piston 6 will then move forward into the equilibrium position. The remainder of the operation of this embodiment is similar to that of FIG. 6, with the spool 50 and the valve piston 153 returning to their retracted positions simultaneously once the boost piston 6 is fully retracted.

The embodiment of FIG. 9 has the advantage that the spool 50 is operated by the valve piston 153 in response to pressure in the chamber 119, and not by fluid pressure in the bore 138 acting to overcome the force in a spring. This means that it is not possible to admit pressurised fluid into the boost chamber 5 until the pressure in chamber 119 has reached its predetermined level. The embodiment of FIG. 9 has the further advantage that the bore 138 in the spool 50 is connected at all times to the reservoir, thus eliminating the reaction felt at the pedal which in the embodiment of FIG. 6, is generated by the fluid pressure in the bore 138 during initial pressurisation of the braking system and is transmitted through the sleeve 49 and the input piston 3. In FIG. 9 the only reaction generated during initial pressurisation is in chamber 119, and this is transmitted to the housing by the boost piston 6.

Figure 11:
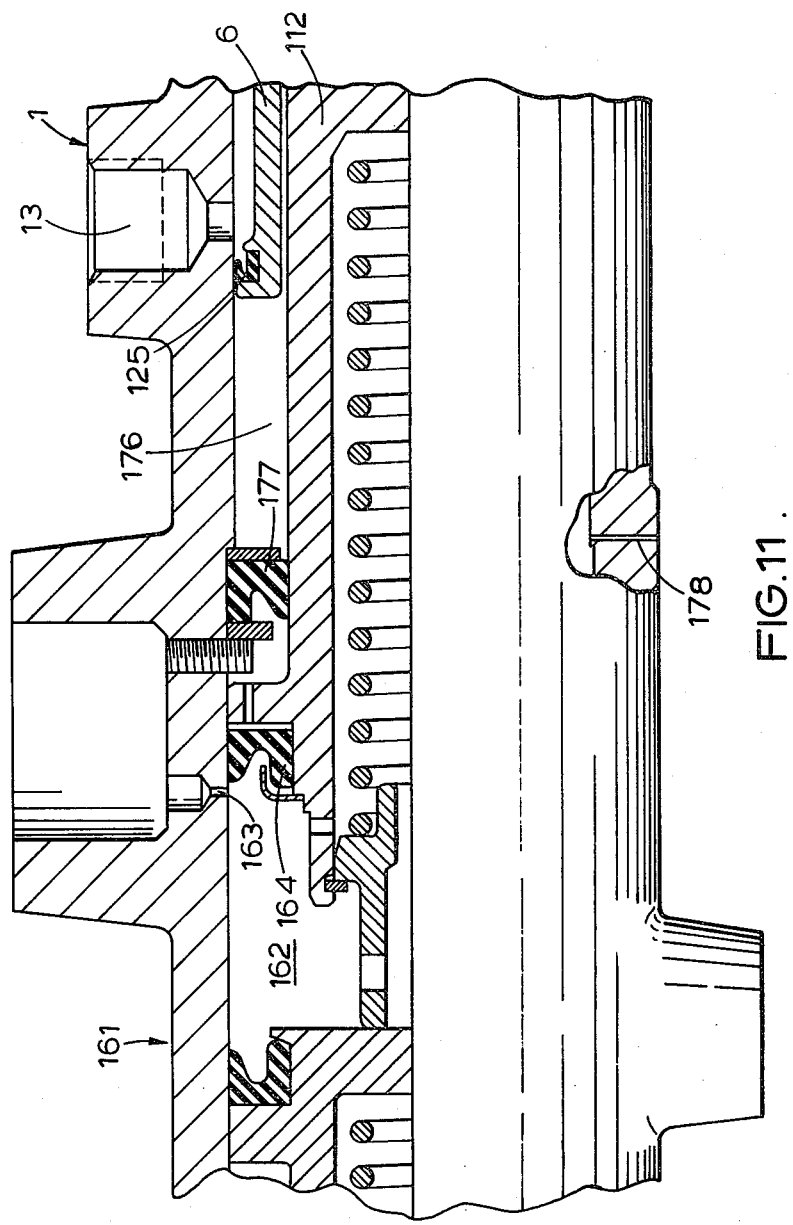
FIG. 11 is a fragmentary section of the booster of FIG. 9 showing it combined with a master cylinder.

FIG. 11 shows the booster of FIG. 9 combined with a master cylinder 161. In this construction the booster and the master cylinder have separate supplies of fluid—the booster has a mineral fluid, whereas the master cylinder uses conventional brake system vegetable or synthetic fluid. As it is important to keep the two fluids separate, a space 176 is provided between the seal 125 on the boost piston 6 and an extra stationary seal 177 in which the combined master cylinder piston and output piston 112 slides. The space 176 is provided with a drainage port 178, out of which fluids leaking into space 176 past seals 125, 155 or 177 can drain, so that the fluids do not contaminate each other.

The construction and operation of FIG. 11 is otherwise the same as that of FIG. 9.

We claim:

1. A pedal-operated booster for a vehicle braking system, comprising a housing, means defining a bore in said housing, an inlet port for connection to a fluid pressure source, an exhaust port for connection to a reservoir for fluid, an input piston to which an input force is applied, an output member through which an output force acts, a boost piston for augmenting said output force working in said bore, means defining a boost chamber in said housing behind said boost piston, said boost piston being advanced in said bore in response to fluid pressure from said source pressurising said boost chamber, and control valve means operative to control a supply of fluid from said source to said booster, said control valve means controlling pressurisation of said boost chamber in response to relative movement of said input piston and said boost piston, operation of said booster being in two stages, in a first stage, following small initial movement of said input piston in a brake-applying direction, said control valve means is operative to control said supply of fluid from said source to said booster to cause said output member to move through a limited distance independently of said input piston, and in a second stage, following further movement of said input piston in a brake-applying direction said control valve means is operative to control pressurisation of said boost chamber to cause continued movement of said output member in proportion to said further movement of said input piston, and said control valve means comprises relatively movable parts, said relatively movable parts including a control bore within said boost piston and a valve mechanism housed in said control bore, said valve mechanism having at least two valve parts, one of said valve parts being movable relative to said input piston, and having a pressure-responsive face, operation of said control valve means being dependent on pressure in said braking system, whereby in said first stage, said control valve means includes means whereby said braking system is pressurised to a threshold level by movement of said output member through an appropriate distance, and fluid pressure from said source is applied to said pressure-responsive face to move said one valve part relative to said input piston to place said boost chamber in communication with said inlet port.

2. A booster as claimed in claim 1, wherein in said first stage said control valve means is operative to pressurise a chamber in said booster to a predetermined level in order to pressurise said braking system to said threshold level.

3. A booster as claimed in claim 1, wherein said control valve mechanism comprises a two-part spool valve assembly, comprising an outer sleeve member and an inner spool member comprising said part provided with said pressure-responsive face.

4. A booster as claimed in claim 1, wherein said control valve means is operable in said first stage following said initial movement of said input piston, to cause pressurisation of said boost chamber to a predetermined level such that said boost piston acts on said output member to cause it to move through said limited distance in order to pressurise said braking system to said threshold level.

5. A booster as claimed in claim 4, wherein said control valve mechanism as a whole is movable relative to said input piston in said first stage, until said predetermined level of pressure in said boost chamber, which is dependent on the reaction applied to said booster from the pressure in said braking system, has been reached.

6. A booster as claimed in claim 5, including a master cylinder circuit actuated by said booster and wherein the full stroke length of said control valve mechanism is greater than or equal to lost-motion produced when said master cylinder circuit fails.

7. A booster as claimed in claim 4, wherein said control valve mechanism works in a control chamber to which fluid pressure from said inlet port is admitted on said initial movement of said input piston, said pressure in said control chamber working on said valve mechanism to move said valve mechanism relative to said input piston to open communication between said inlet port and said boost chamber via said control chamber, and when said boost chamber is pressurised to said predetermined level said valve mechanism is operable to trap fluid in a part of said control chamber to prevent further relative movement between said input piston and said valve mechanism on further movement of said input piston in a brake-applying direction.

8. A booster as claimed in claim 7, wherein, when said predetermined level of pressure in said boost chamber is reached, said pressure in said control chamber acts on said pressure-responsive face of said one part of said valve mechanism to overcome the force in a spring, and to move said one part relative to said input piston to trap fluid in said control chamber.

9. A booster as claimed in claim 8, wherein said one part moves in said brake-applying direction relative to said input piston.

10. A booster as claimed in claim 8, wherein said control chamber is formed in said input piston, and the said movement of said one part of said valve mechanism closes a valve on said valve mechanism through which said control chamber communicates with said inlet port.

11. A booster as claimed in claim 1, wherein an auxiliary pressure chamber is incorporated between said boost piston and said output member, and in said first stage on said initial movement of said input piston said control valve means is operative to pressurise said auxiliary chamber to move said output member through said limited distance to pressurise said braking system to said threshold level, and at a predetermined level of pressure supplied to said auxiliary chamber an auxiliary valve closes to trap fluid in said auxiliary chamber, said control valve means then being operative to open communication between said boost chamber and said inlet port.

12. A booster as claimed in claim 11, wherein said auxiliary chamber is located within said boost piston.

13. A booster as claimed in claim 11, wherein said auxiliary valve comprises a valve member which is adapted to close when a predetermined pressure, which is dependent on the reaction applied to said booster from the pressure in said braking system, is supplied to said auxiliary chamber.

14. A booster as claimed in claim 13, wherein said valve member comprises a member biassed to closure by a spring, but held open by a spring-loaded auxiliary piston, said piston being responsive to said pressure supplied to said chamber to allow said auxiliary valve to close when said predetermined pressure is reached.

15. A booster as claimed in claim 12, wherein one member of said control valve mechanism is coupled to said input piston, and only said one part having said pressure-responsive face is movable relative to said input piston.

16. A booster as claimed in claim 15, wherein said valve mechanism comprises an outer sleeve member and an inner spool member, and said sleeve member is coupled to said input piston.

17. A booster as claimed in claim 11, wherein closure of said auxiliary valve results in the increase in pressure of the fluid applied to the pressure-responsive face, to move said one part relative to said input piston to place said inlet port in communication with said boost chamber.

18. A booster as claimed in claim 11, wherein closure of said auxiliary valve acts directly on said one part of said valve mechanism to move it in order to place said inlet port in communication with said boost chamber.

19. A booster as claimed in claim 14, wherein said auxiliary piston is coupled to said one part of said valve mechanism, said pressure-responsive face being provided on said piston, such that movement of said piston in response to said predetermined level of pressure supplied to said auxiliary chamber to allow said auxiliary valve to close also moves said one part relatively towards said input piston to place said inlet port in communication with said boost chamber.

* * * * *